US 7,793,086 B2

(12) United States Patent
Alexander

(10) Patent No.: US 7,793,086 B2
(45) Date of Patent: Sep. 7, 2010

(54) LINK STACK MISPREDICTION RESOLUTION

(75) Inventor: Gregory W. Alexander, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 352 days.

(21) Appl. No.: 11/852,443

(22) Filed: Sep. 10, 2007

(65) Prior Publication Data

US 2009/0070561 A1 Mar. 12, 2009

(51) Int. Cl.
*G06F 11/28* (2006.01)

(52) U.S. Cl. ..................................................... 712/242

(58) Field of Classification Search ........................ None
See application file for complete search history.

(56) References Cited

U.S. PATENT DOCUMENTS

| | | | | |
|---|---|---|---|---|
| 6,108,771 | A * | 8/2000 | Gaertner et al. | 712/217 |
| 6,119,223 | A * | 9/2000 | Witt | 712/244 |
| 6,374,350 | B1 * | 4/2002 | D'Sa et al. | 712/239 |
| 6,633,974 | B1 | 10/2003 | Sinharoy | |
| 6,848,044 | B2 | 1/2005 | Eisen et al. | |
| 7,055,020 | B2 * | 5/2006 | Gold et al. | 712/217 |
| 7,231,511 | B2 * | 6/2007 | Cornaby et al. | 712/239 |
| 7,406,587 | B1 * | 7/2008 | Zhang et al. | 712/217 |
| 2001/0004755 | A1 * | 6/2001 | Levy et al. | 712/217 |
| 2003/0163671 | A1 * | 8/2003 | Gschwind et al. | 712/214 |
| 2005/0138334 | A1 * | 6/2005 | Sodani et al. | 712/218 |

* cited by examiner

*Primary Examiner*—Eric Coleman
(74) *Attorney, Agent, or Firm*—Yee & Associates, P.C.; Diana R. Gerhardt

(57) ABSTRACT

A method for link stack misprediction resolution using a rename structure for tracking the link stack processing, in order to quickly resolve link stack corruption from mispredicted function returns. The method comprises establishing a set of physical data structures forming a common pool and an operation control table. Maintaining, within the common pool, a plurality of entries for a plurality of speculative instructions and a plurality of non-speculative instructions. And determining one speculative instruction to be a bad prediction speculative entry, identifying related entries to form a collection, and discarding the collection.

18 Claims, 25 Drawing Sheets

COMPLETED LIST 202

| INDEX (NOT STORED IN ARRAY) | RETURN ADDRESS | OLDER INDEX | YOUNGER INDEX | EVICTED INDEX |
|---|---|---|---|---|
| 0 | 0x123456789ABCDEF |  | 1 | ? |
| 1 | 0x00000000000000A |  | 2 | 0 |
| 2 | 0x00000000000000B |  | ? | 1 |
|  |  |  |  |  |

ACTIVE QUEUE 204

| INDEX (NOT STORED IN ARRAY) | RETURN ADDRESS | OLDER INDEX | YOUNGER INDEX | EVICTED INDEX |
|---|---|---|---|---|
| 4 | 0x00000000000000D |  | 5 | 1 |
| 5 | 0x00000000000000E | 4 | 6 | 1 |
| 6 | 0x00000000000000F | 5 | ? | 1 |
|  |  |  |  |  |

FREE LIST 206

| INDEX (NOT STORED IN ARRAY) | RETURN ADDRESS | OLDER INDEX | YOUNGER INDEX | EVICTED INDEX |
|---|---|---|---|---|
| 15 |  |  | 3 |  |
| 3 |  |  | 7 |  |
| 7 |  |  | 8 |  |
| ⋮ | ⋮ | ⋮ | ⋮ | ⋮ |
| 14 |  |  | ? |  |

208 — STACK POINTER | 1

216 — LOGICAL STACK
| 0x123456789ABCDEF |
| 0x00000000000000A |

210 —
INSTRUCTION SEQUENCE:
- COMPLETE:
  1. 0x123456789ABCDEF: Call
  2. 0x0...0A: Call
  3. 0x0...0B: Call
- SPECULATIVE:
  4. Return to 0x0...0B
  5. 0x0...0D: Call
  6. Return to 0x0...0D
  7. 0x0...0E: Call
  8. Return to 0x0...0E
  9. 0x0...0F: Call
  10. Return to 0x0...0F

*FIG. 3C*

| COMPLETED LIST 202 | INDEX (NOT STORED IN ARRAY) | RETURN ADDRESS | OLDER INDEX | YOUNGER INDEX | EVICTED INDEX |
|---|---|---|---|---|---|
| | 0 | 0x123456789ABCDEF | | 1 | ? |
| | 1 | 0x000000000000000A | | 2 | 0 |
| | 2 | 0x000000000000000B | | ? | 1 |

| ACTIVE QUEUE 204 | INDEX (NOT STORED IN ARRAY) | RETURN ADDRESS | OLDER INDEX | YOUNGER INDEX | EVICTED INDEX |
|---|---|---|---|---|---|
| | 4 | 0x000000000000000D | | 5 | 1 |
| | 5 | 0x000000000000000E | 4 | 6 | 1 |
| | 6 | 0x000000000000000F | 5 | ? | 1 |

| FREE LIST 206 | INDEX (NOT STORED IN ARRAY) | RETURN ADDRESS | OLDER INDEX | YOUNGER INDEX | EVICTED INDEX |
|---|---|---|---|---|---|
| | 15 | | | 3 | |
| | 3 | | | 7 | |
| | 7 | | | 8 | |
| | ⋮ | ⋮ | ⋮ | ⋮ | ⋮ |
| | 14 | | | ? | |

208 — STACK POINTER | 1

216 — LOGICAL STACK
0x123456789ABCDEF
0x000000000000000A

210 — INSTRUCTION SEQUENCE:
- COMPLETE:
  1. 0x123456789ABCDEF: Call
  2. 0x0...0A: Call
  3. 0x0...0B: Call
- SPECULATIVE:
  4. Return to 0x0...0B
  5. 0x0...0D: Call
  6. Return to 0x0...0D
  7. 0x0...0E: Call
  8. Return to 0x0...0E
  9. 0x0...0F: Call
  10. Return to 0x0...0F

*FIG. 4A*

| BRANCH NUMBER (JUST FOR IDENTIFICATION, NOT IN ARRAY) | STACK POINTER | ACTIVE TAIL | ALLOCATED |
|---|---|---|---|
| 4 | 2 | NULL | 0 |
| 5 | 1 | NULL | 1 |
| 6 | 4 | 4 | 0 |
| 7 | 1 | 4 | 1 |
| 8 | 5 | 5 | 0 |
| 9 | 1 | 5 | 1 |
| 10 | 6 | 6 | 0 |

| INDEX (NOT STORED IN ARRAY) | RETURN ADDRESS | OLDER INDEX | YOUNGER INDEX | EVICTED INDEX | COMMENTS |
|---|---|---|---|---|---|
| 0 | 0x123456789ABCDEF | | 1 | | COMPLETED HEAD |
| 1 | 0x000000000000000A | | 2 | 0 | STACK POINTER |
| 2 | 0x000000000000000B | | | 1 | COMPLETED TAIL |
| 3 | | | 7 | | |
| 4 | 0x000000000000000D | | 5 | 1 | ACTIVE HEAD |
| 5 | 0x000000000000000E | 4 | 6 | 1 | |
| 6 | 0x000000000000000F | 5 | | 1 | ACTIVE TAIL |
| 7 | | | 8 | | |
| 8 | | | 9 | | |
| 9 | | | 10 | | |
| 10 | | | 11 | | |
| 11 | | | 12 | | |
| 12 | | | 13 | | |
| 13 | | | 14 | | |
| 14 | | | | | FREE TAIL |
| 15 | | | 3 | | FREE HEAD |

212

| | COMPLETED LIST | |
|---|---|---|
| HEAD | 0 | |
| TAIL | 2 | |

202

| | ACTIVE QUEUE | |
|---|---|---|
| HEAD | 4 | |
| TAIL | 6 | |

204

| | FREE LIST | |
|---|---|---|
| HEAD | 15 | |
| TAIL | 14 | |

206

| STACK POINTER | 1 |
|---|---|

208

| FLUSHING | STACK POINTER | ACTIVE TAIL | ALLOCATED |
|---|---|---|---|
| 6 | 4 | 4 | 0 |

218

210

INSTRUCTION SEQUENCE:
- COMPLETE:
  1. 0x123456789ABCDEF: Call
  2. 0x0...0A: Call
  3. 0x0...0B: Call
- SPECULATIVE:
  4. Return to 0x0...0B
  5. 0x0...0D: Call
  6. Return to 0x0...0D
  7. 0x0...0E: Call
  8. Return to 0x0...0E
  9. 0x0...0F: Call
  10. Return to 0x0...0F

*FIG. 4F*                                     200

| INDEX (NOT STORED IN ARRAY) | RETURN ADDRESS | OLDER INDEX | YOUNGER INDEX | EVICTED INDEX | COMMENTS |
|---|---|---|---|---|---|
| 0 | 0x123456789ABCDEF | | 1 | | COMPLETED HEAD |
| 1 | 0x000000000000000A | | 2 | 0 | |
| 2 | 0x000000000000000B | | | 1 | COMPLETED TAIL |
| 3 | | | 7 | | |
| 4 | 0x000000000000000D | | 5 | 1 | ACTIVE HEAD, STACK POINTER |
| 5 | 0x000000000000000E | 4 | 6 | 1 | |
| 6 | 0x000000000000000F | 5 | | 1 | ACTIVE TAIL |
| 7 | | | 8 | | |
| 8 | | | 9 | | |
| 9 | | | 10 | | |
| 10 | | | 11 | | |
| 11 | | | 12 | | |
| 12 | | | 13 | | |
| 13 | | | 14 | | |
| 14 | | | | | FREE TAIL |
| 15 | | | 3 | | FREE HEAD |

| COMPLETED LIST | |
|---|---|
| HEAD | 0 |
| TAIL | 2 |

← 202

| ACTIVE QUEUE | |
|---|---|
| HEAD | 4 |
| TAIL | 6 |

← 204

| FREE LIST | |
|---|---|
| HEAD | 15 |
| TAIL | 14 |

← 206

| STACK POINTER | 4 |
|---|---|

← 208

| FLUSHING | STACK POINTER | ACTIVE TAIL | ALLOCATED |
|---|---|---|---|
| 6 | 4 | 4 | 0 |

← 218

INSTRUCTION SEQUENCE:
- COMPLETE:
  1. 0x123456789ABCDEF: Call
  2. 0x0...0A: Call
  3. 0x0...0B: Call
- SPECULATIVE:
  4. Return to 0x0...0B
  5. 0x0...0D: Call
  6. Return to 0x0...0D
  7. 0x0...0E: Call
  8. Return to 0x0...0E
  9. 0x0...0F: Call
  10. Return to 0x0...0F 210
212

| INDEX (NOT STORED IN ARRAY) | RETURN ADDRESS | OLDER INDEX | YOUNGER INDEX | EVICTED INDEX | COMMENTS |
|---|---|---|---|---|---|
| 0 | 0x123456789ABCDEF | | 1 | | COMPLETED HEAD |
| 1 | 0x000000000000000A | | 2 | 0 | |
| 2 | 0x000000000000000B | | | 1 | COMPLETED TAIL |
| 3 | | | 7 | | |
| 4 | 0x000000000000000D | | 5 | 1 | ACTIVE HEAD, STACK POINTER |
| 5 | 0x000000000000000E | 4 | 6 | 1 | |
| 6 | 0x000000000000000F | 5 | | 1 | ACTIVE TAIL |
| 7 | | | 8 | | |
| 8 | | | 9 | | |
| 9 | | | 10 | | |
| 10 | | | 11 | | |
| 11 | | | 12 | | |
| 12 | | | 13 | | |
| 13 | | | 14 | | |
| 14 | | | 5 | | FREE TAIL |
| 15 | | | 3 | | FREE HEAD |

| COMPLETED LIST | |
|---|---|
| HEAD | 0 |
| TAIL | 2 |

← 202

| ACTIVE QUEUE | |
|---|---|
| HEAD | 4 |
| TAIL | 6 |

← 204

| FREE LIST | |
|---|---|
| HEAD | 15 |
| TAIL | 14 |

← 206

| STACK POINTER | 4 |
|---|---|

← 208

| FLUSHING | STACK POINTER | ACTIVE TAIL | ALLOCATED |
|---|---|---|---|
| 6 | 4 | 4 | 0 |

← 218

212

210

INSTRUCTION SEQUENCE:
- COMPLETE:
  1. 0x123456789ABCDEF: Call
  2. 0x0...0A: Call
  3. 0x0...0B: Call
- SPECULATIVE:
  4. Return to 0x0...0B
  5. 0x0...0D: Call
  6. Return to 0x0...0D
  7. 0x0...0E: Call
  8. Return to 0x0...0E
  9. 0x0...0F: Call
  10. Return to 0x0...0F

| INDEX (NOT STORED IN ARRAY) | RETURN ARRAY | OLDER INDEX | YOUNGER INDEX | EVICTED INDEX | COMMENTS |
|---|---|---|---|---|---|
| 0 | 0x123456789ABCDEF | | 1 | | COMPLETED HEAD |
| 1 | 0x000000000000000A | | 2 | 0 | |
| 2 | 0x000000000000000B | | | 1 | COMPLETED TAIL |
| 3 | | | 7 | | |
| 4 | 0x000000000000000D | | 5 | 1 | ACTIVE HEAD, STACK POINTER, ACTIVE TAIL |
| 5 | 0x000000000000000E | 4 | 6 | 1 | |
| 6 | 0x000000000000000F | 5 | | 1 | FREE TAIL |
| 7 | | | 8 | | |
| 8 | | | 9 | | |
| 9 | | | 10 | | |
| 10 | | | 11 | | |
| 11 | | | 12 | | |
| 12 | | | 13 | | |
| 13 | | | 14 | | |
| 14 | | | 5 | | |
| 15 | | | 3 | | FREE HEAD |

| | COMPLETED LIST | |
|---|---|---|
| HEAD | 0 | |
| TAIL | 2 | ~202 |

212

| | ACTIVE QUEUE | |
|---|---|---|
| HEAD | 4 | |
| TAIL | 4 | ~204 |

| | FREE LIST | |
|---|---|---|
| HEAD | 15 | |
| TAIL | 6 | ~206 |

| STACK POINTER | 4 | ~208 |
|---|---|---|

| FLUSHING | STACK POINTER | ACTIVE TAIL | ALLOCATED |
|---|---|---|---|
| 6 | 4 | 4 | 0 |

~218

210

INSTRUCTION SEQUENCE:

- COMPLETE:
  1. 0x123456789ABCDEF: Call
  2. 0x0...0A: Call
  3. 0x0...0B: Call
- SPECULATIVE:
  4. Return to 0x0...0B
  5. 0x0...0D: Call
  6.

| BRANCH NUMBER (JUST FOR IDENTIFICATION, NOT IN ARRAY) | STACK POINTER | ACTIVE TAIL | ALLOCATED |
|---|---|---|---|
| 4 | 2 | NULL | 0 |
| 5 | 1 | NULL | 1 |
| 6 | 4 | 4 | 0 |
| 7 | 1 | 4 | 1 |
| 8 | 5 | 5 | 0 |
| 9 | 1 | 5 | 1 |
| 10 | 6 | 6 | 0 |

214

| COMPLETED LIST 202 | INDEX (NOT STORED IN ARRAY) | RETURN ADDRESS | OLDER INDEX | YOUNGER INDEX | EVICTED INDEX |
|---|---|---|---|---|---|
| | 0 | 0x123456789ABCDEF | | 1 | ? |
| | 1 | 0x000000000000000A | | 2 | 0 |
| | 2 | 0x000000000000000B | | ? | 1 |

| ACTIVE QUEUE 204 | INDEX (NOT STORED IN ARRAY) | RETURN ADDRESS | OLDER INDEX | YOUNGER INDEX | EVICTED INDEX |
|---|---|---|---|---|---|
| | 4 | 0x000000000000000D | | 5 | 1 |
| | 5 | 0x000000000000000E | 4 | 6 | 1 |
| | 6 | 0x000000000000000F | 5 | ? | 1 |

| FREE LIST 206 | INDEX (NOT STORED IN ARRAY) | RETURN ADDRESS | OLDER INDEX | YOUNGER INDEX | EVICTED INDEX |
|---|---|---|---|---|---|
| | 15 | | | 3 | |
| | 3 | | | 7 | |
| | 7 | | | 8 | |
| | ⋮ | ⋮ | ⋮ | ⋮ | ⋮ |
| | 14 | | | ? | |

| 208 | STACK POINTER | 1 |
|---|---|---|

| 216 | LOGICAL STACK |
|---|---|
| | 0x123456789ABCDEF |
| | 0x000000000000000A |

INSTRUCTION SEQUENCE:

- COMPLETE:
  1. 0x123456789ABCDEF: Call
  2. 0x0...0A: Call
  3. 0x0...0B: Call
- SPECULATIVE:
  4. Return to 0x0...0B
  5. 0x0...0D: Call
  6. Return to 0x0...0D
  7. 0x0...0E: Call
  8. Return to 0x0...0E
  9. 0x0...0F: Call
  10. Return to 0x0...0F

| COMPLETED LIST 202 | INDEX (NOT STORED IN ARRAY) | RETURN ADDRESS | OLDER INDEX | YOUNGER INDEX | EVICTED INDEX |
|---|---|---|---|---|---|
| | 0 | 0x123456789ABCDEF | | 1 | ? |
| | 1 | 0x000000000000000A | | 2 | 0 |
| | 2 | 0x000000000000000B | | ? | 1 |

| ACTIVE QUEUE 204 | INDEX (NOT STORED IN ARRAY) | RETURN ADDRESS | OLDER INDEX | YOUNGER INDEX | EVICTED INDEX |
|---|---|---|---|---|---|
| | | | | | |

| | INDEX (NOT STORED IN ARRAY) | RETURN ADDRESS | OLDER INDEX | YOUNGER INDEX | EVICTED INDEX |
|---|---|---|---|---|---|
| | 4 | | | 5 | |
| | 5 | | | 6 | |
| | 6 | | | 15 | |
| 206 FREE LIST | 15 | | | 3 | |
| | 3 | | | 7 | |
| | 7 | | | 8 | |
| | ⋮ | ⋮ | ⋮ | ⋮ | ⋮ |
| | 14 | | | ? | |

| 208 | STACK POINTER | 1 |
|---|---|---|

| 216 | LOGICAL STACK |
|---|---|
| | 0x123456789ABCDEF |
| | 0x000000000000000A |

INSTRUCTION SEQUENCE:

- COMPLETE:
  1. 0x123456789ABCDEF: Call
  2. 0x0...0A: Call
  3. 0x0...0B: Call
- SPECULATIVE:
  4. Return to 0x0...0B

| COMPLETED LIST 202 | INDEX (NOT STORED IN ARRAY) | RETURN ADDRESS | OLDER INDEX | YOUNGER INDEX | EVICTED INDEX |
|---|---|---|---|---|---|
| | 0 | 0x123456789ABCDEF | | 1 | ? |
| | 1 | 0x000000000000000A | | 2 | 0 |
| | 2 | 0x000000000000000B | | ? | 1 |

| ACTIVE QUEUE 204 | INDEX (NOT STORED IN ARRAY) | RETURN ADDRESS | OLDER INDEX | YOUNGER INDEX | EVICTED INDEX |
|---|---|---|---|---|---|
| | 4 | 0x000000000000000D | | 5 | 1 |
| | 5 | 0x000000000000000E | 4 | 6 | 1 |
| | 6 | 0x000000000000000F | 5 | ? | 1 |

| | INDEX (NOT STORED IN ARRAY) | RETURN ADDRESS | OLDER INDEX | YOUNGER INDEX | EVICTED INDEX |
|---|---|---|---|---|---|
| | 15 | | | 3 | |
| 206 FREE LIST | 3 | | | 7 | |
| | 7 | | | 8 | |
| | ⋮ | ⋮ | ⋮ | ⋮ | ⋮ |
| | 14 | | | ? | |

| 208 | STACK POINTER | 1 |
|---|---|---|

| 216 | LOGICAL STACK |
|---|---|
| | 0x123456789ABCDEF |
| | 0x000000000000000A |

210 →

INSTRUCTION SEQUENCE:

- COMPLETE:
  1. 0x123456789ABCDEF: Call
  2. 0x0...0A: Call
  3. 0x0...0B: Call
- SPECULATIVE:
  4. Return to 0x0...0B
  5. 0x0...0D: Call
  6. Return to 0x0...0D
  7. 0x0...0E: Call
  8. Return to 0x0...0E
  9. 0x0...0F: Call
  10. Return to 0x0...0F

*FIG. 6K*

LINK STACK MISPREDICTION RESOLUTION

BACKGROUND OF THE INVENTION

1. Field of the Invention

The present invention relates generally to an improved data processing system and in particular to a method and apparatus for managing link stacks. Still more particularly the present invention provides a computer implemented method, apparatus, and computer usable program code for improved link stack misprediction resolution.

2. Description of the Related Art

In data processing systems, instructions are routinely processed to perform desired functions and thereby produce repeatable predictable results. During the processing of a sequence of instructions, many modern processors incorporate branching and prediction capabilities as part of the instruction processing operations to speed the flow of execution. This type of forward processing attempts to look ahead or predict the next operation or sequence of events based on the current instruction or set of instructions being processed. In some cases, this prediction is incorrect and must be resolved.

Typically, resolution involves backing out of the instruction sequence to a point where the environment was before the incorrect prediction occurred. To return to this known previous state or point, the purging or flushing of many instructions and pieces of related data may have occurred. During the flush operation, attempts are mode to restore or recover data representative of a state of the current process prior to the incorrect prediction. The recovery process may involve moving a series of entries from one storage location to another as well as the maintenance of a series of commands to accomplish the desired data movement.

Restoration is typically performed in a sequential manner, entry by entry, to return to the last known good instance. This sequential processing involving the movement of many entries by copying is time consuming and may cause loss of processor productivity.

In some cases, the backward chaining information may be lost or destroyed during the intervening processing operations. In such cases, there can be no graceful recovery.

SUMMARY OF THE INVENTION

One illustrative embodiment provides a computer implemented method for link stack misprediction resolution, the method comprising establishing a set of physical data structures forming a common pool and an operation control table; maintaining, within the common pool, a plurality of entries for a plurality of speculative instructions and a plurality of non-speculative instructions; determining one speculative instruction to be a bad prediction speculative entry, identifying related entries to form a collection; and discarding the collection.

Another illustrative embodiment provides a data processing system for link stack misprediction resolution, the data processing comprising means for establishing a set of physical data structures forming a common pool and an operation control table; means for maintaining, within the common pool, a plurality of entries for a plurality of speculative instructions and a plurality of non-speculative instructions; means for determining one speculative instruction to be a bad prediction speculative entry, identifying related entries to form a collection; and means for discarding the collection.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 3A-3C are tabular views of the set of physical data structures of FIG. 2 in accordance with illustrative embodiments;

FIGS. 4A-4I are tabular views of the set of physical data structures of FIG. 2 during a flush operation in accordance with illustrative embodiments;

FIG. 5 is a simplified flow diagram of a flush operation in accordance with illustrative embodiments;

FIGS. 6A-6K are tabular views of a set of physical data structures showing results of processing prior to the flush operation sequence of FIGS. 4A-4I in accordance with illustrative embodiments.

DETAILED DESCRIPTION OF THE PREFERRED EMBODIMENT

Figure 1:
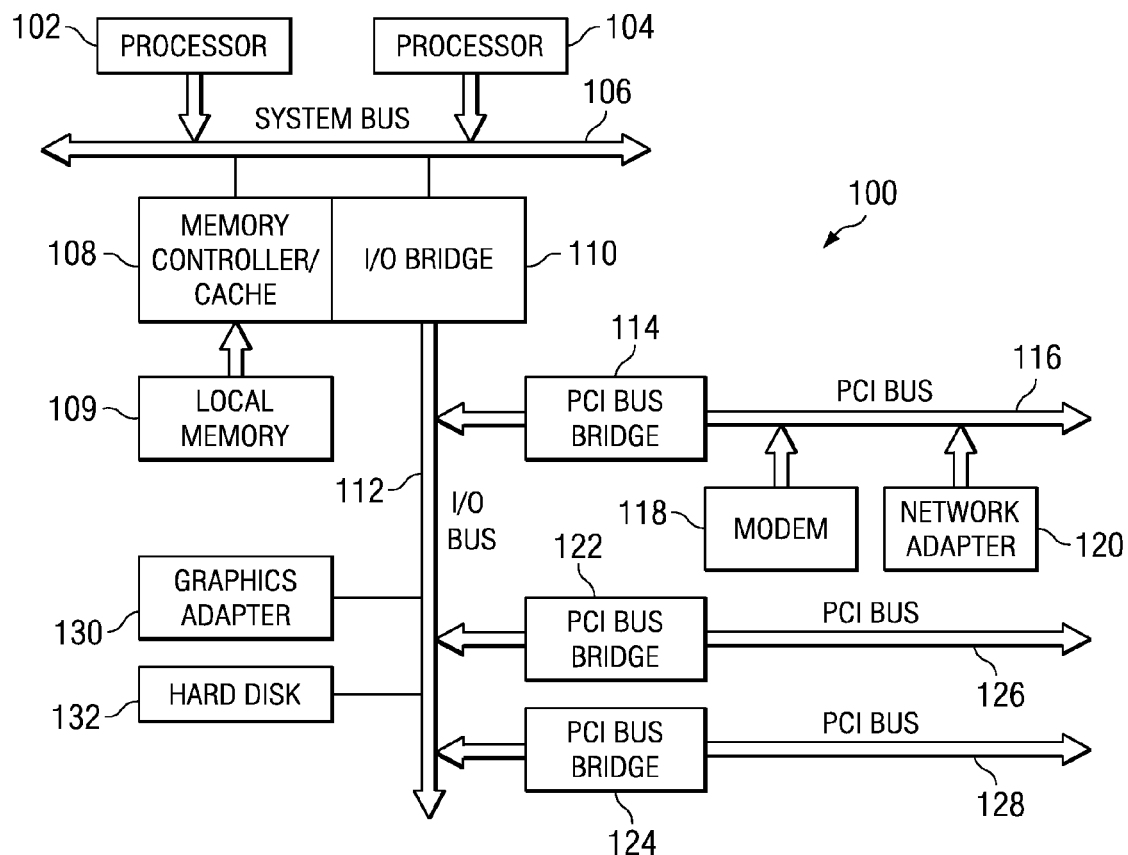
FIG. 1 is a block diagram of a data processing system in accordance with illustrative embodiments.

With reference now to the figures, and in particular with reference to FIG. 1, a schematic diagram of a data processing system in accordance with an embodiment of the present invention is depicted.

Data processing system 100 may be a symmetric multiprocessor (SMP) system including a plurality of processors 102 and 104 connected to system bus 106. Alternatively, a single processor system may be employed. Also connected to system bus 106 is memory controller/cache 108, which provides an interface to local memory 109. I/O bus bridge 110 is connected to system bus 106 and provides an interface to I/O bus 112. Memory controller/cache 108 and I/O bus bridge 110 may be integrated as depicted.

Peripheral component interconnect (PCI) bus bridge 114 connected to I/O bus 112 provides an interface to PCI local bus 116. A number of modems 118-120 may be connected to PCI bus 116. Typical PCI bus implementations will support four PCI expansion slots or add-in connectors. Communications links to network computers may be provided through modem 118 and network adapter 120 connected to PCI local bus 116 through add-in boards.

Additional PCI bus bridges 122 and 124 provide interfaces for additional PCI buses 126 and 128, from which additional modems or network adapters may be supported. In this manner, system 100 allows connections to multiple network computers. The replication of systems and connections among them form a collection of interconnected distributed systems such as those comprising proxy servers and distributed directory services servers in accordance with an embodiment of the present invention. A memory mapped graphics adapter 130 and hard disk 132 may also be connected to I/O bus 112 as depicted, either directly or indirectly.

Those of ordinary skill in the art will appreciate that the hardware depicted in FIG. 1 may vary. For example, other peripheral devices, such as optical disk drive and the like also may be used in addition or in place of the hardware depicted. The depicted example is not meant to imply architectural limitations with respect to the present invention.

The data processing system depicted in FIG. 1 may be, for example, an IBM RISC/System 6000 system, a product of International Business Machines Corporation in Armonk, N.Y., running the Advanced Interactive Executive (AIX) operating system.

Illustrative embodiments build upon an operating environment including selected hardware elements within a central processing unit including branch/system processing unit, load/store unit, instruction cache and data cache, registers and other execution and processor storage units as are known in data processing.

Figure 2:
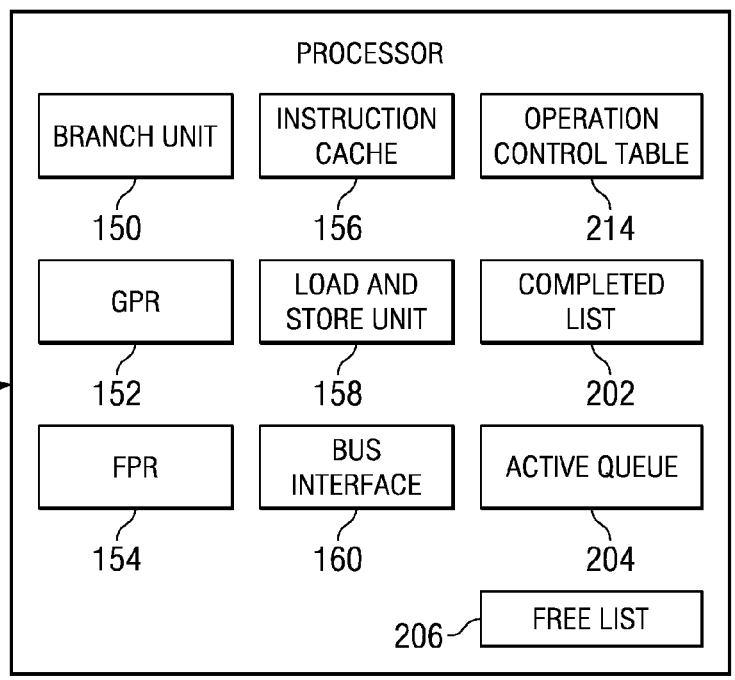
FIG. 2 is a block diagram of components of the processor of FIG. 1 including physical data structures in accordance with illustrative embodiments.

Referring to FIG. 2, a block diagram of a high level overview of a subset of components of processor 102 of FIG. 1 is shown in accordance with the illustrative embodiments. The subset of components represents a portion of the composition of processor 102 to establish a context within which illustrative embodiments may function. For example, processor 102 may include branch unit 150, a plurality of registers including both general purpose registers 152 and floating point registers 154, instruction cache 156, a load and store unit 158, and a bus interface 160 has other components and circuitry necessary for the performance of its function.

Bus interface 160 controls the transfer of information between processor 102 and system bus 106 of FIG. 1. Branch unit 150, an example of an execution unit of processor 102, indicates memory addresses of sequences of instructions to execute including those involving speculative or predicted processing. Instruction cache 156 contains sequences of instructions ready to execute. Load and store unit 158 communicates with general purpose registers 152 and floating point registers 154 to manage input and output of source operand information.

Processor 102 further comprises components of an operation control table 214, completed list 202, active queue 204 and free list 206. Although shown as separate physical structures, completed list 202 and free list 206 may alternatively be implemented as one physical structure with free list 206 being a first portion of completed list 202.

Physical data structures completed list 202, active queue 204 and free list 206 form a common pool of instruction processing tracking information. This common pool contains information used to efficiently recover after an incorrect or also referred to as a bad instruction prediction occurs.

Figure 3A:
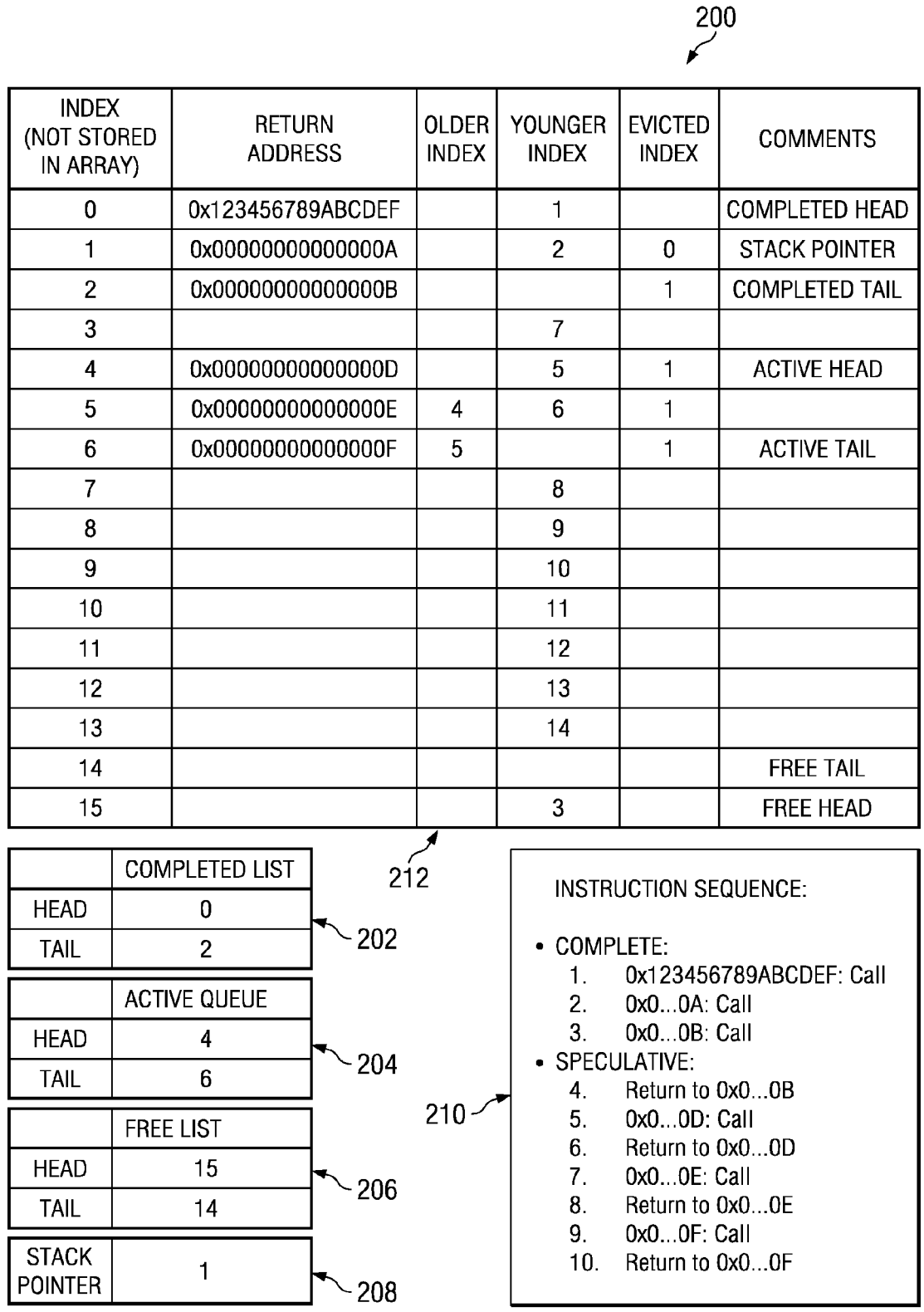

With reference to FIG. 3A, in accordance with an illustrative embodiment, a tabular view of a set of physical data structures 200 in data processing system 100 of FIG. 1, is shown in which link stack 212 performance improvement may be attained through use of "rename" physical data structures 200 for tracking link stack 212 processing, in order to more efficiently resolve link stack 212 corruption due to mispredicted function returns. The rename usage of physical data structures 200 makes use of the concept of register renaming on processors as is known in the art. Physical data structures 200 may typically be implemented and initialized, as is known in the art, in components including a static random access memory (SRAM) arrays and register files. Such an embodiment provides an improved design for link stack 212 using rename physical data structures 200 to minimize link stack 212 corruption in cases other than resource constraints.

Illustrative embodiments typically improve on traditional link stack 212 design that can often be corrupted by branch misprediction. By using a single rename pool of physical data structures 200 for both complete and speculative entries, embodiments of the present invention typically restore the state of link stack 212 efficiently on a flush operation thereby improving restoration performance and reducing complexity.

Embodiments of the present invention typically build upon existing hardware support for predicting the targets of function call returns, through additional support comprising a single pool of physical data structures 200 containing predictable return targets, both non-speculative and speculative. Physical data structures 200 comprise two or more linked lists for the maintenance of return target information. Physical data structures 200, in accordance with illustrative embodiments, in combination with existing hardware support for branch prediction, typically enables flushing speculative entries in a single operation that only modifies list pointers. Physical data structures 200 enable efficient tracking of operations during execution of instruction stream 210 by normal hardware means of pointer maintenance, register file update, and instruction branch processing.

A set of lists within physical data structures 200 are manipulated to track the changes during instruction execution. The set comprises lists, also referred herein interchangeably as queues, indicating instruction status of completed list 202 which is a stack structure of completed instructions and active queue 204 which renames function calls that push link stack 212 but have not yet completed, and free list 206 which renames instructions that are no longer being used and do not yet have any useful call stack data. Completed list 202 contains non-speculative instruction information, while active queue 204 contains speculative instruction information for those instructions still being processed. Two or more lists may be used because free list 206 may be placed at the head of completed list 202 as an implementation variant. Further link stack 212 comprising $2^n-1$ entries, including a flag value and entries of, entry, and pointers for evicted, younger, and older, wherein older is only used for active queue 204.

Figure 3B:
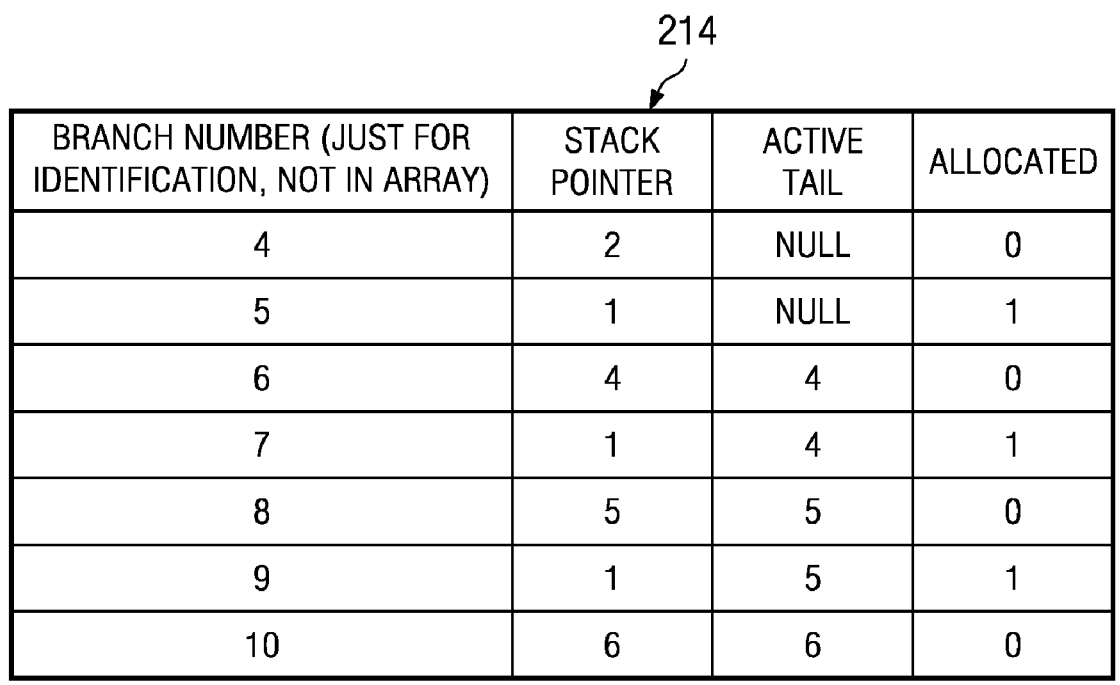

Turning briefly to FIG. 3B, processors performing predictive or speculative instruction execution may have instructions that require additional information to be tracked in operation control table 214. Additional information, that may be obtained from an operation control table 214 or other suitable maintained storage area containing branch related information, or other set or subset of instructions pending within instruction execution stream 210. Operation control table 214 typically contains data comprising entries of a stack pointer 208 value, indicating the location to move the stack on flush operation; a pointer for active queue 204 indicating a last active pointer on an unallocated entry, or in another variation an allocated pointer on an allocated entry; and Allocated, indicating if there was an allocation of an entry associated with this prediction. This last piece of information may be determined from the branch type of the instruction and the associated predicted direction derived from the instructions within the instruction stream. For example, the third row of operation control table 214 contains values 6, 4, 4 and 0 representing flushing, stack pointer 208, active queue 204 tail and allocated entry respectively. Value 6 as found in operation control table 214, or row 218 of operation control table 214 of FIG. 4D, is used only for illustrative comparison with instruction stream 210 and is not otherwise maintained in a physical structure.

The external state of the structures is represented by pointers of Completed list 202 head, tail; active queue 204 head, tail; free list 206 head, tail; last completed, which is a special pointer for last entry of link stack 212 with a completed write; and stack pointer 208. The initial state is one in which all link stack 212 entries are free.

Each queue entry has, in addition to basic bookkeeping, a return address entry representing the address to return to on function return and an evicted entry representing link stack 212 entry that is current prior to the call that allocated this instant entry. Also, a separate stack pointer 208 points to the current link stack 212 entry.

With reference to FIG. 3C, a tabular view is depicted of a logical layout of completed list 202, active queue 204 and free list 206 as well as stack pointer 208 and sequence of instructions in instruction stream 210. Logical stack 216 provides a representation of the instructions remaining on the stack having an active or completed status. Instruction stream 210 is not maintained as part of physical data structures 200 but is shown for completeness as an aid in understanding the exemplary process.

With reference to FIGS. 3A-3C, example operations using the just described physical data structures 200 are provided.

When a taken function call is fetched, the return address is allocated a rename and placed on active queue 204. Stack pointer 208 then points at the newly allocated entry. Upon completion, the entry allocated is added to completed list 202.

When a taken function return is fetched, the predicted target address is the address pointed to by a current stack pointer 208, and the stack pointer 208 is changed to point at the entry evicted by the current stack pointer 208. Upon completion, the youngest completed entry is removed from completed list 202 and added to free list 206.

On a flush operation, all flushed entries are moved from active queue 204 to free list 206. Stack pointer 208 is accordingly pointing to a location prior to the flush.

When allocating a new rename entry, if no rename entries are available on free list 206, the oldest entry on completed list 202 is used instead. This has minimum rename count implications. Normal care should be taken to manage the resources associated with the lists, often referred to as queues, so as to not delete entries that are needed or in use by other entries. For example, the head of completed list 202 should not be taken and used as a free list 206 entry if other elements of link stack 212 or operation control table 214 make reference to it.

On any not taken call or return and any other operation tracked by operation control table 214, of FIG. 3B, write to operation control table 214 setting values activeptr=active tail, stackptr=stack pointer, allocated=0.

On the fetch of a call, such as branch and link, where predict is taken, then allocate link stack 212 entry for 0x0A. Put entry 0x0A on the tail of active queue 204. Set entry 0x0A->evicted=stack pointer and write the call return address into entry 0x0A. Write into operation control 214 entries activeptr=old active tail, stackptr=Stack pointer, and allocated=1. A variation would include setting activeptr=A, allocated=1 and set stack pointer 208 to 0x0A.

On the fetch of a return, such as branch and clear register, and predict is taken, then write into operation control table 214 values of activeptr=active tail, stackptr=stack pointer, and allocated=0. The predicted target of the return is Stack pointer->address.

On the issue of a correctly predicted branch, do nothing. On the issue of a return, and predict is taken, result is taken, but the wrong target, do nothing. The data is wrong and there is no simple correction.

On the issue of a call, and predict is taken, and the result not taken, then read from operation control table 214 for stackptr, activeptr, and (allocated=1). Set the Stack pointer=stackptr and Flush activeptr, (allocated=0). Flush operation will be described in more detail but this is a basic operation that occurs when a sequence of speculative instructions tracked in operation control table 214 will not be executed and therefore, will have to be removed. Determination of a bad prediction is done using known hardware techniques and circuitry of conventional processors and will not be described further. A bad prediction occurs when a speculative instruction leads to an incorrect branch instruction address and therefore is a bad prediction.

The flush operation "moves" the previously allocated entry and all younger entries from Active queue 204 to Free list 206. Then mark operation control table 214 not taken. Optionally write operation control table 214 with allocated=0, skip for variations.

On the issue of a call, with predict not taken, but result taken, then read from operation control table 214 for stackptr, activeptr, and (allocated=0). Then flush activeptr, (allocated=0), causing all younger entries to move from active queue 204 to free list 206. Mark operation control table 214 taken and allocate a link stack 212 entry 0x0A. Put entry 0x0A on tail of active 204 list. Set A->evicted=stackptr, write call return value into entry 0x0A, then set Stack pointer to entry 0x0A.

On the issue of a return, with predict taken, and result not taken, read from operation control table 214 for stackptr, activptr, (allocated=0). Set the Stack pointer=stackptr and Flush activeptr, (allocated=0) causing all younger entries to "move" from the active queue 204 to free list 206. Mark operation control table 214 not taken.

On the issue of a return, with predict not taken, and result taken, read from operation control table 214 for stackptr, activptr, (allocated=0). Then flush activeptr, (allocated=0), "moving" all younger entries from active queue 204 to free list 206. Mark operation control table 214 taken and set stack pointer=stackptr->evicted.

On the issue of any other incorrectly predicted branch, read from operation control table 214 for stackptr, activptr, (allocated=0). Set Stack pointer=stackptr and flush activeptr, (allocated=0). This causes "movement" of all younger entries from active queue 204 to free list 206.

On the completion of a taken call, update the last written entry to point to active queue 204 head, which is used for flushing operations. "Move" the active queue 204 head onto completed list 202 tail.

On the completion of a not-taken call do nothing. In a variation, if allocated is indicated, then update the last written entry to point to the active queue 204 head moving the old last written entry to free list 206 if it is not the completed tail. Remove active queue 204 head from the active queue 204. Allocated lookup here can be removed by always allocating on call, even when predict was not taken.

On the completion of a taken return, "move" completed list 202 tail onto free list 206 if completed list 202 tail is not the last written, used for flushing, then set completed list 202 tail=completed list 202 tail->evicted.

On the completion of a not-taken return, do nothing. On completion of any other branch, do nothing.

On determination of an incorrect prediction, use of stack rename physical data structures 200, in accordance with an illustrative embodiment, enables efficient recovery to the state prior to the error of the incorrect prediction by rebuilding. This rebuilding is achieved through pointer manipulation rather than typical sequential entry processing and associated data copying as done before.

With relatively few operations one may move the content of active queue 204 onto free list 206 to recover from the situation caused by the incorrect prediction associated with an instruction, thereby restoring to the state prior to the failure. Operations just described do not require the typical sequential backward processing of the chain of instructions in the instruction stream below the point at which a flush is needed as may have been the case before. Rather, pointer manipulation is used. Fewer operations represent fewer machine cycles and therefore less time to recover. Pointer manipulation in accordance with an illustrative embodiment enables data associated with the instructions involved in the flush operation does not have to be copied and therefore the flush operation requires less time for recovery.

Figure 4B:
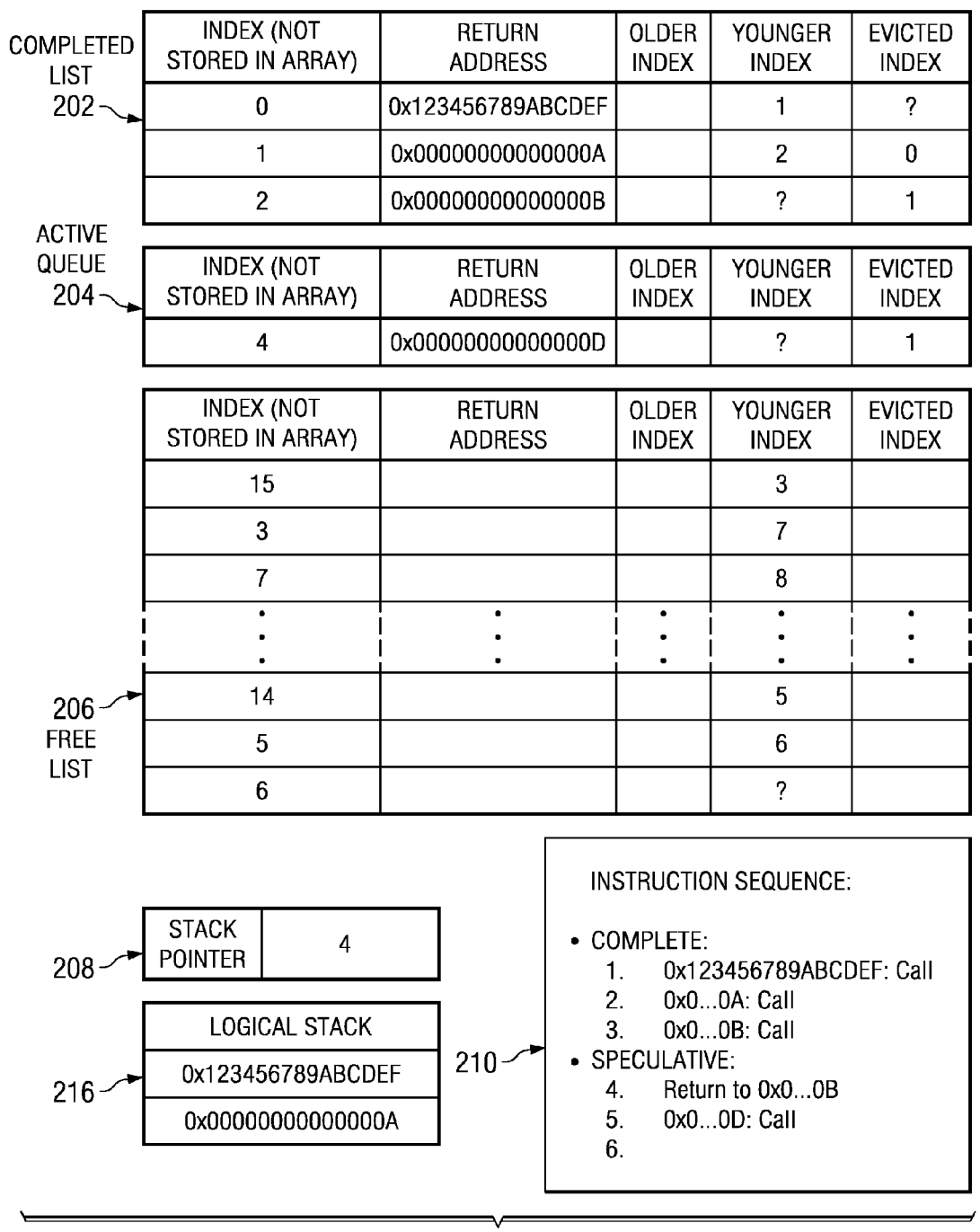

With reference to FIGS. 4A-4I, a tabular view of the physical data structures 200 involved in the flush operation is shown in accordance with illustrative embodiments. FIG. 4A shows an initial state of representative values for elements of physical data structures 200.

Figure 4C:
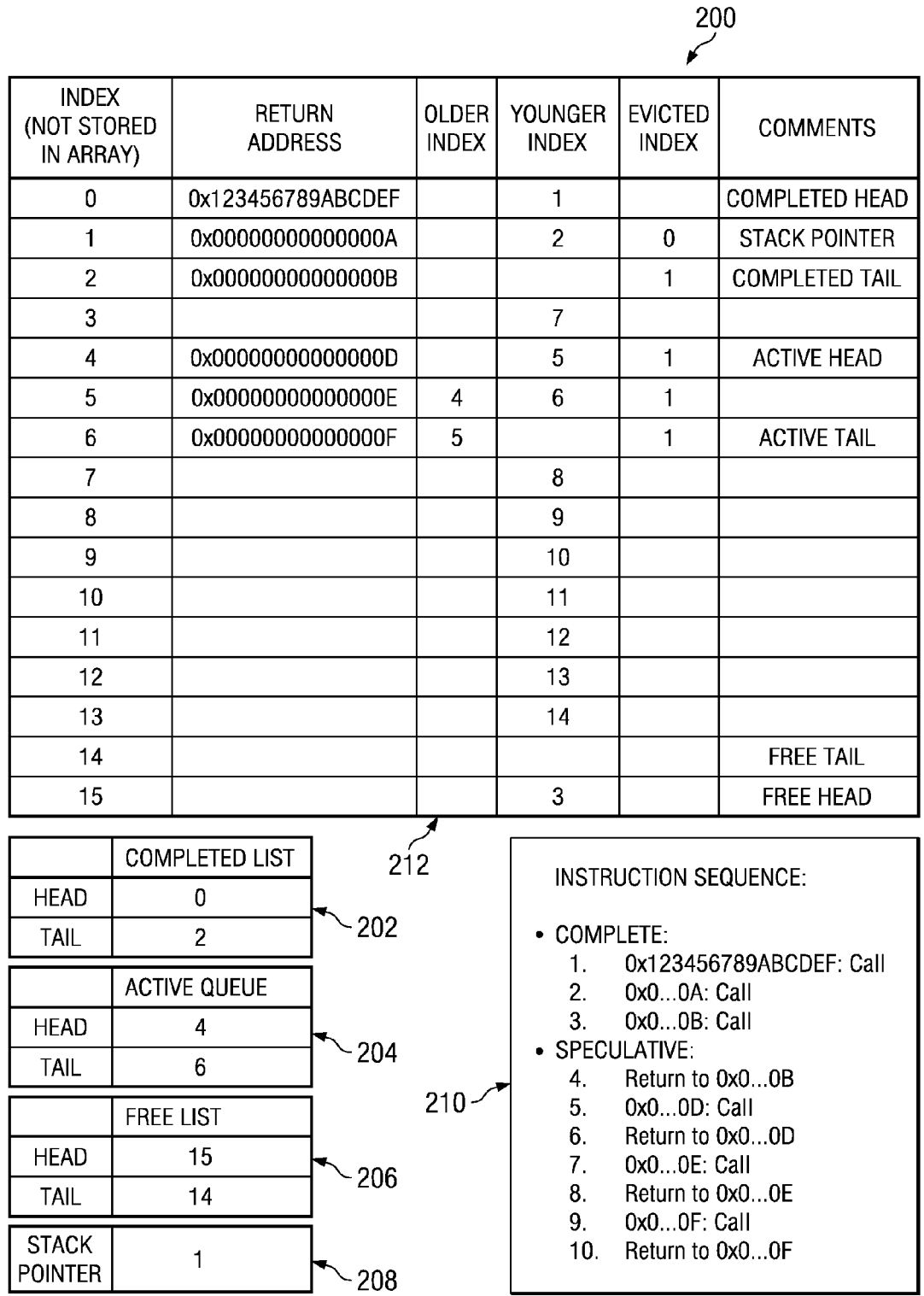

FIG. 4B shows the results of the flush operation. Note the state of instruction sequence 210 and stack pointer 208. FIG. 4C provides a view including a representation of link stack 212. FIG. 4D provides a representation of operation control table 214 with row 218 being of particular interest having information useful during the flush. FIG. 4E is a representation at the beginning of the flush operation with row 218 information included.

Figure 4H:
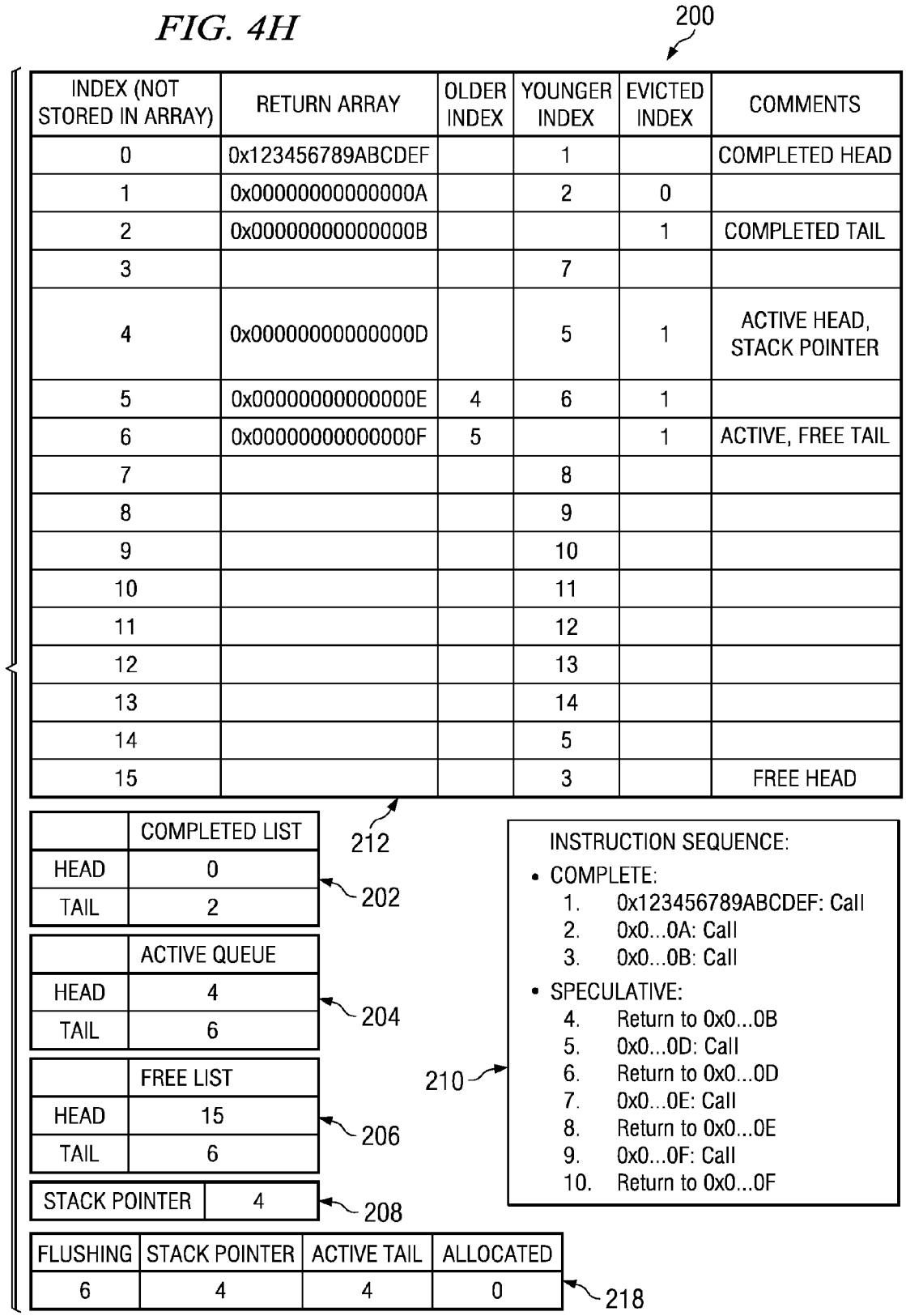

FIG. 4F shows the result of setting stack pointer 208 to the value obtained from row 218 flushing stack pointer. FIG. 4G shows the result of setting younger index of the free list 206 tail=younger index of the flushing active queue 204 tail from information in row 218. FIG. 4H shows the result of setting free list 206 tail equal to active queue 204 tail. FIG. 4I shows the result of setting active queue 204 tail to the value of flushed active queue 204 tail of row 218 of operation control table 214.

The sequence of instructions, 6 through 10, of instruction stream 210 has been eliminated with manipulation of the pointers just described. No traversing of instruction stream 210 was required in the performance of the flush. Stack pointer 208 now points reliably to the next instruction for execution. Entries freed as a result of the flush have been returned to free list 206 for future use, thereby replenishing the resource.

Figures 5, 6B:
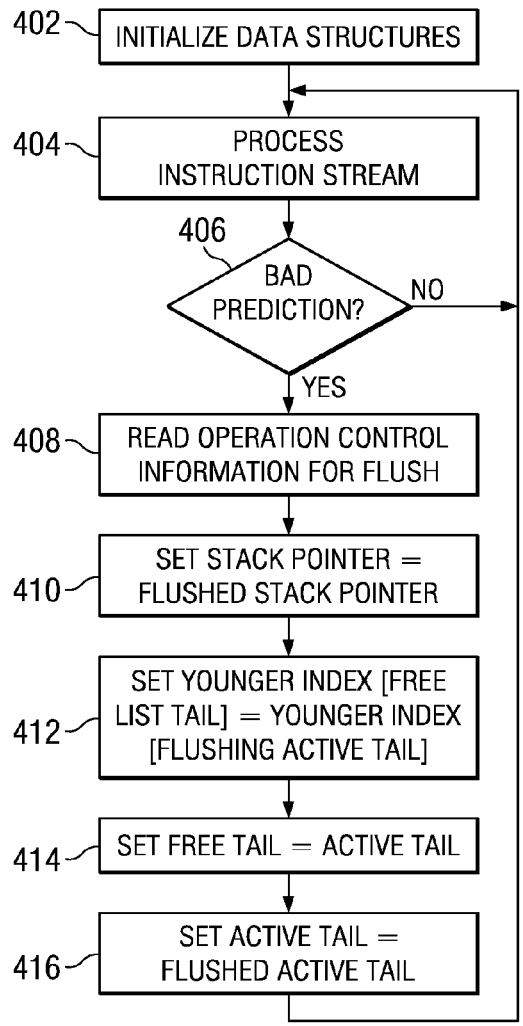
Figure 6A:
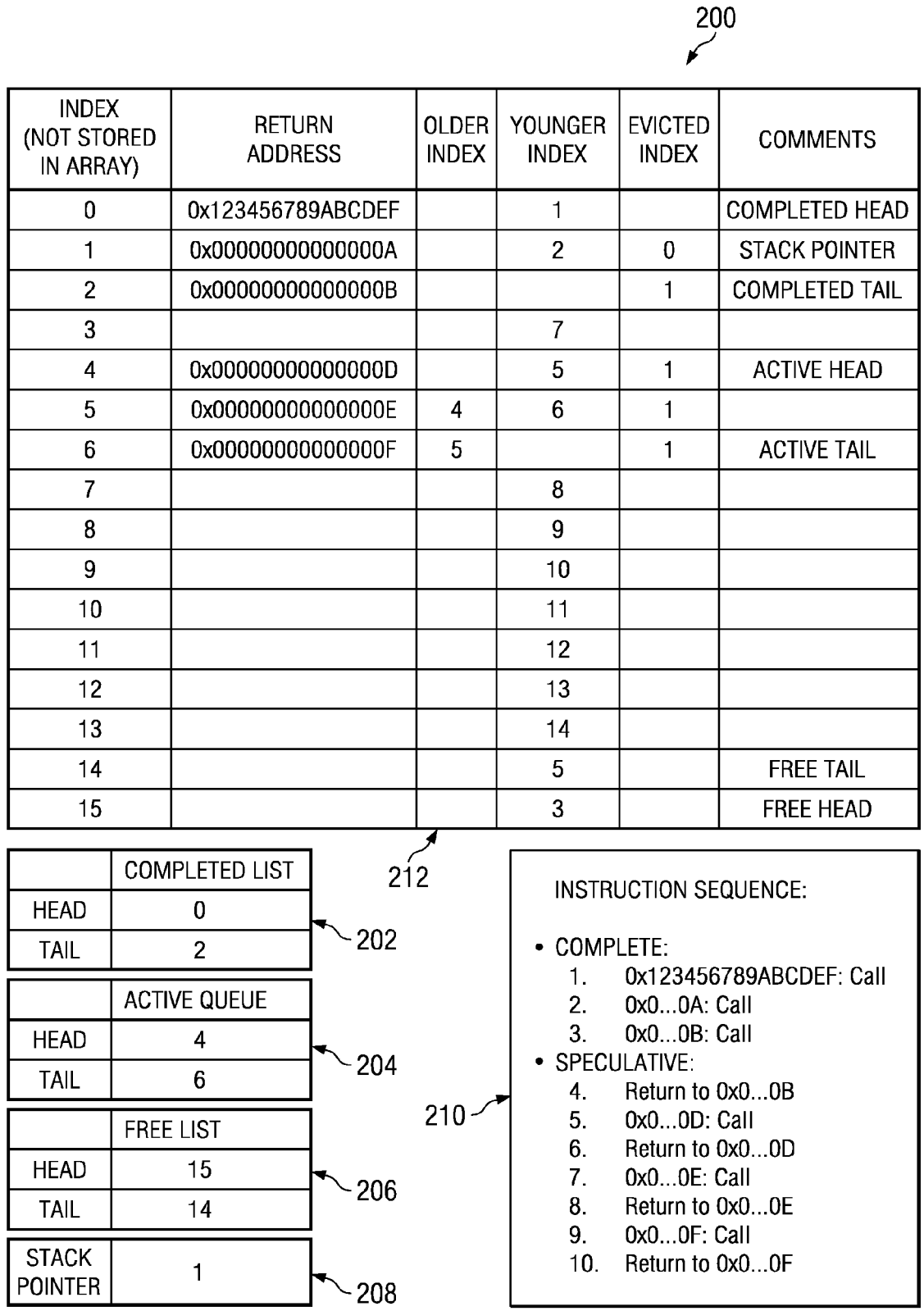
Figure 6D:
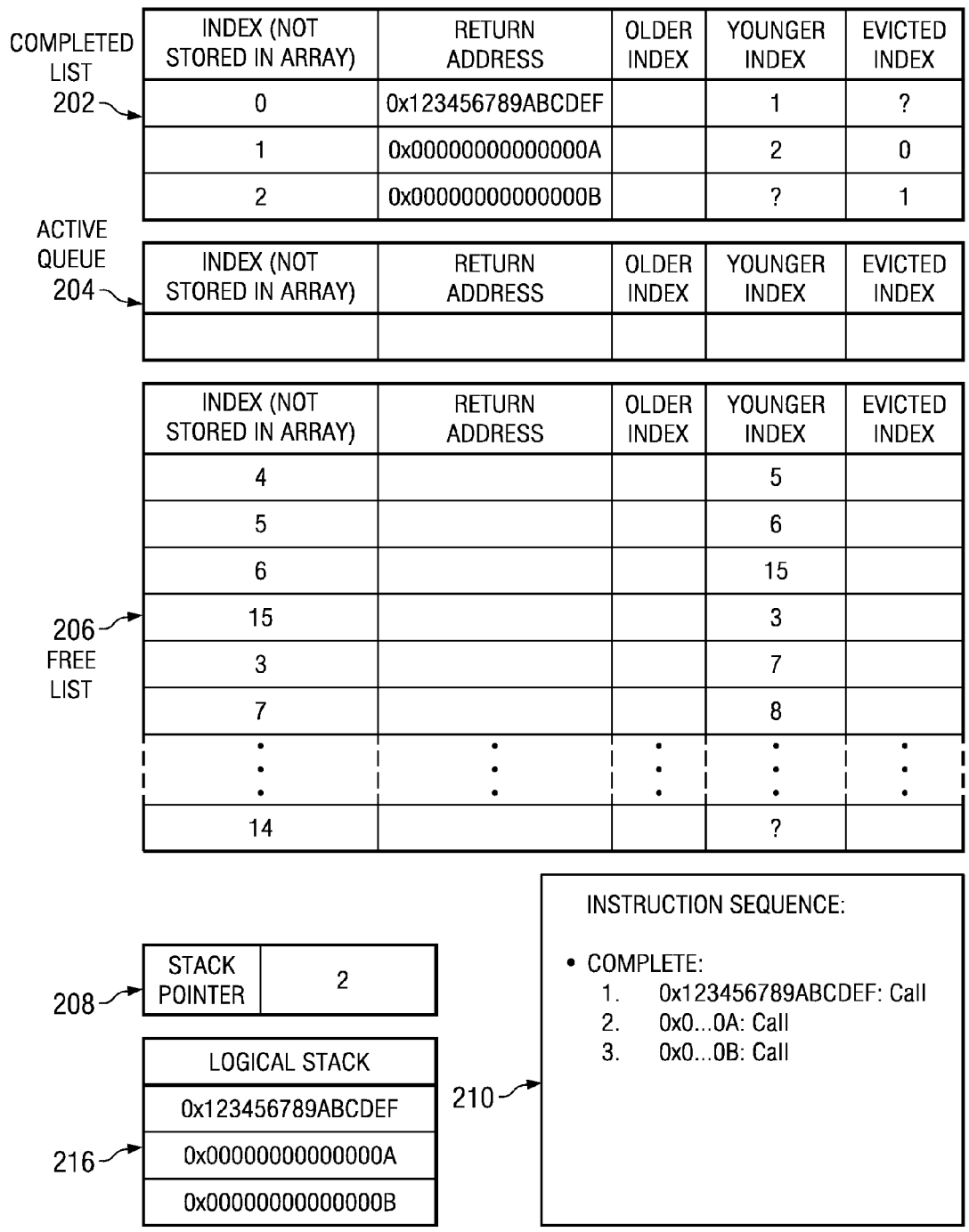
Figure 6F:
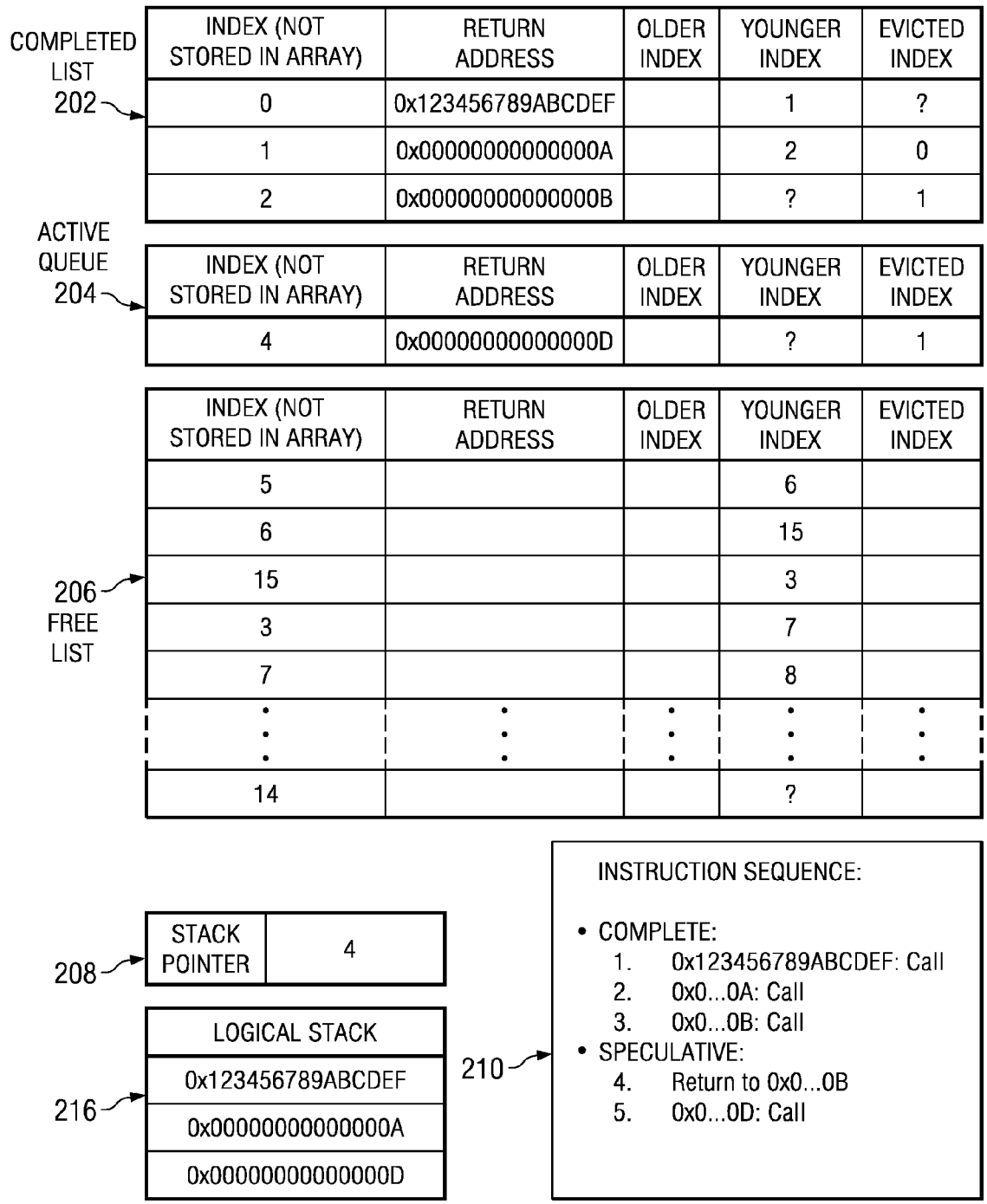
Figure 6G:
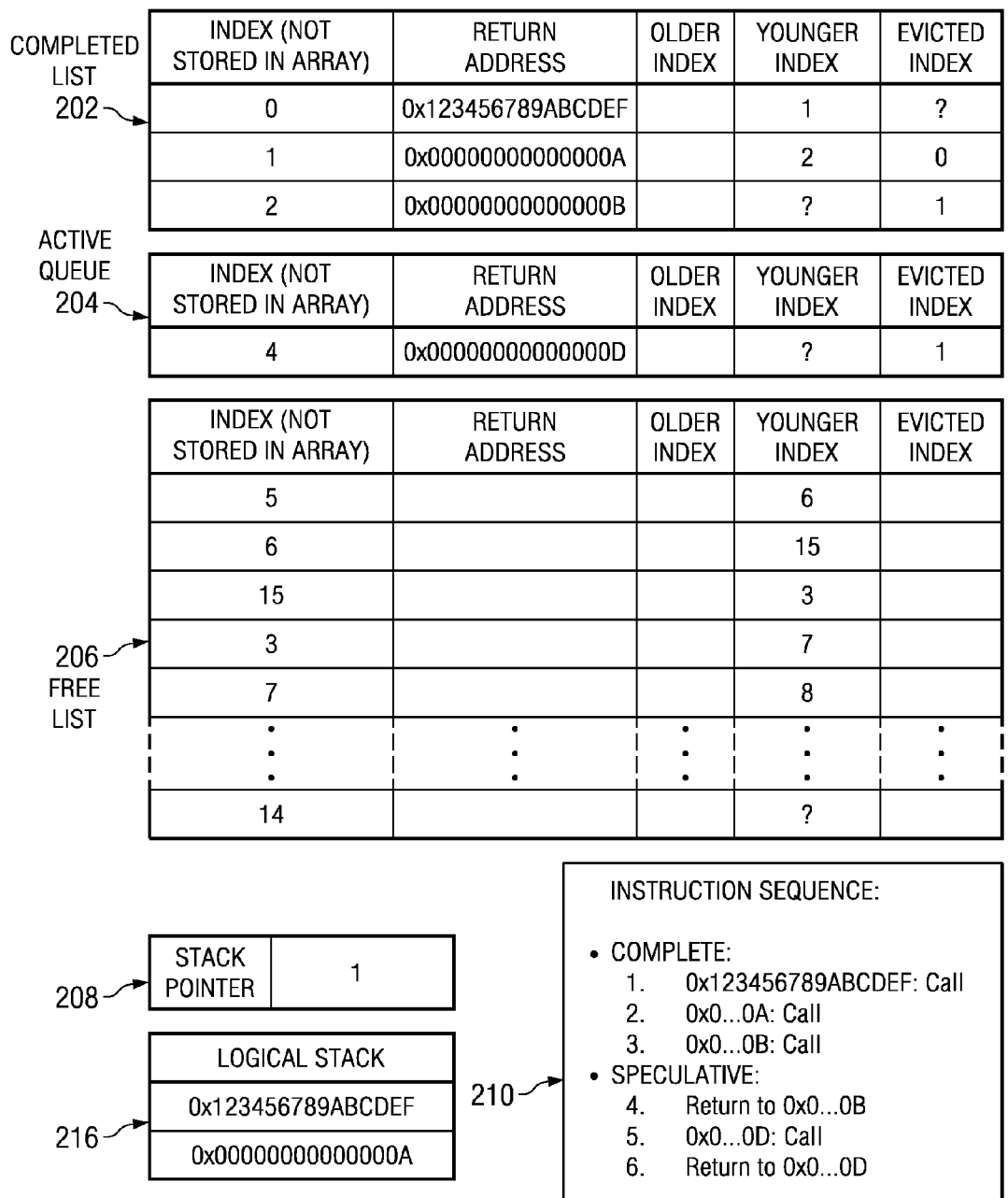
Figure 6H:
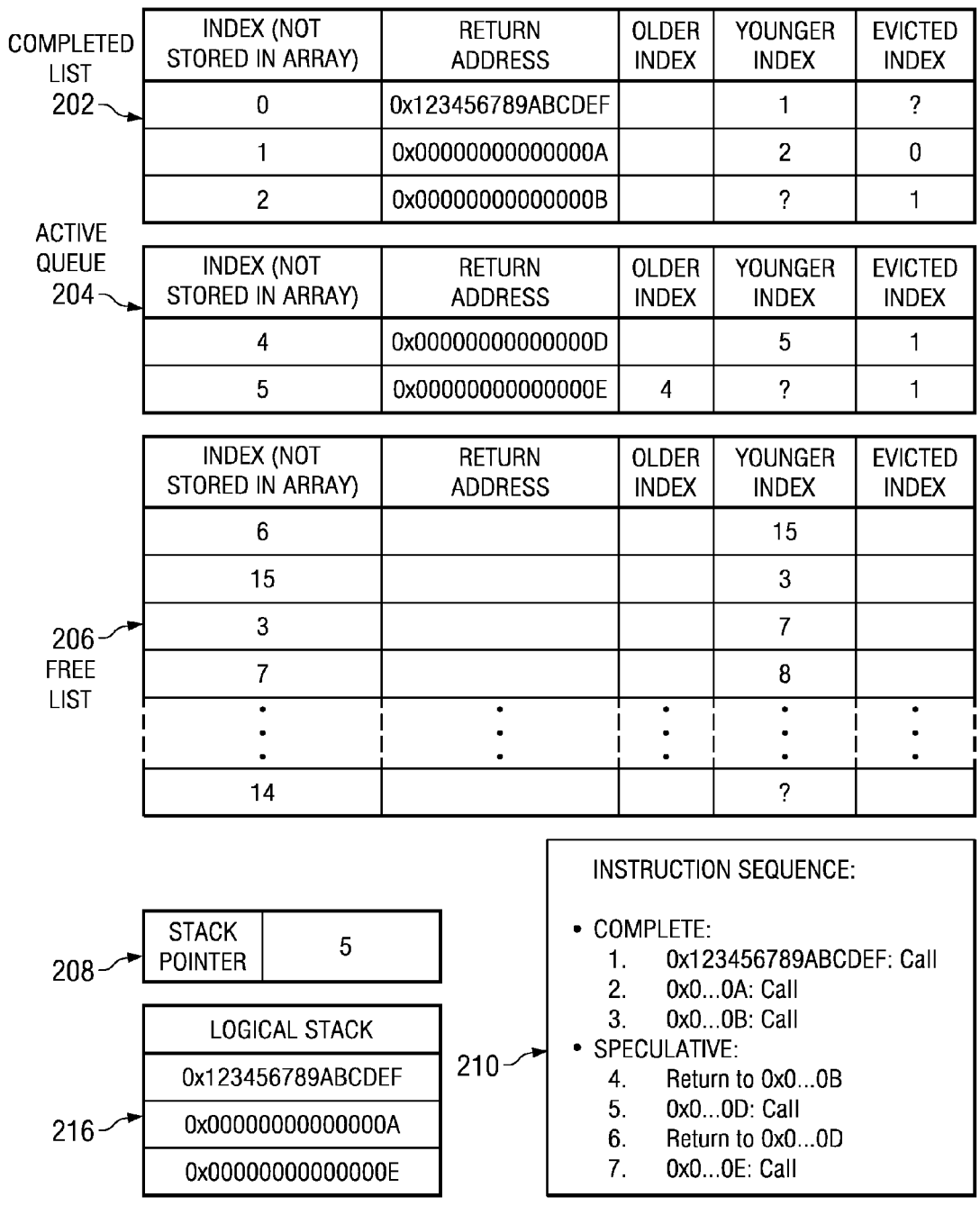
Figure 6I:
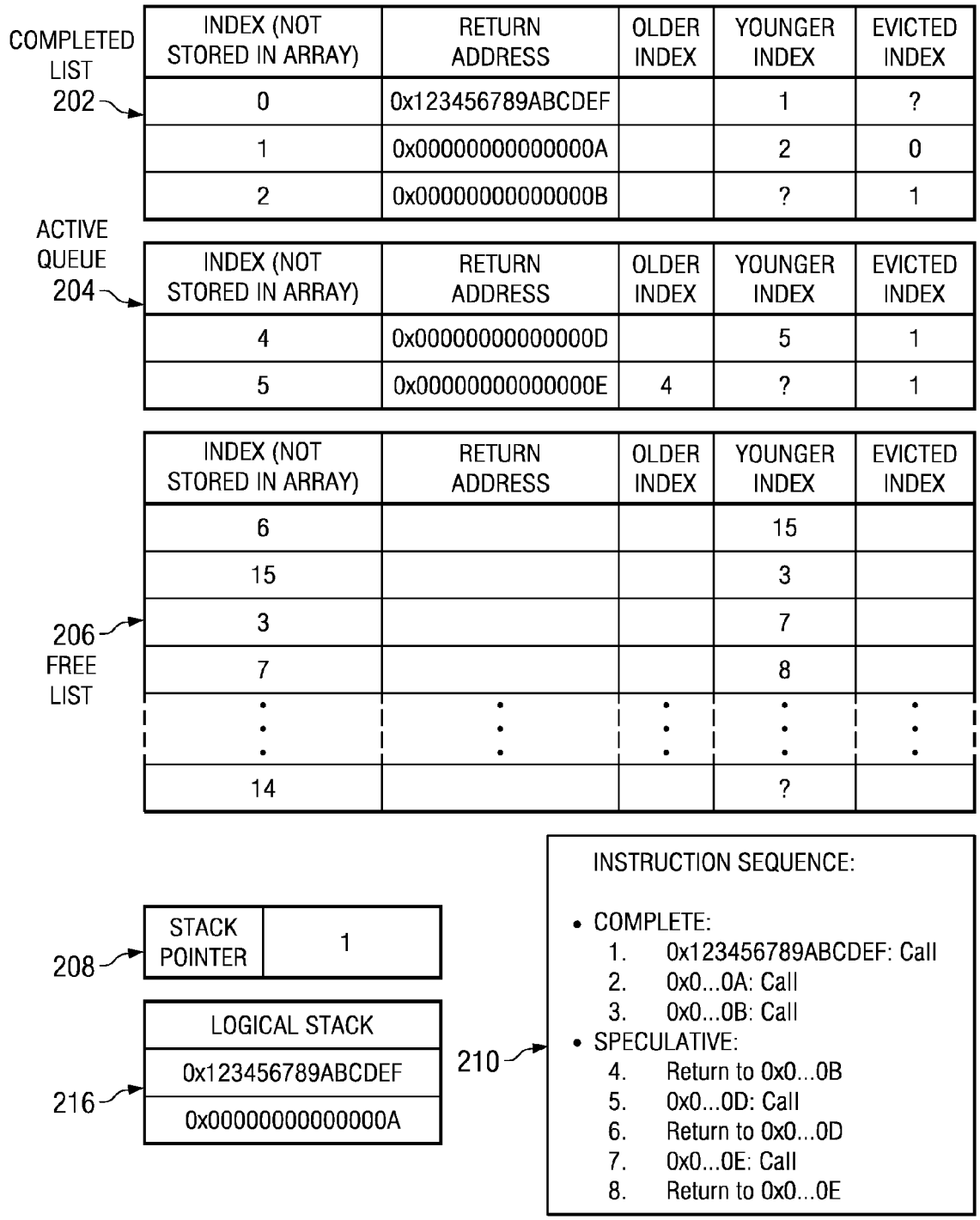
Figure 6J:
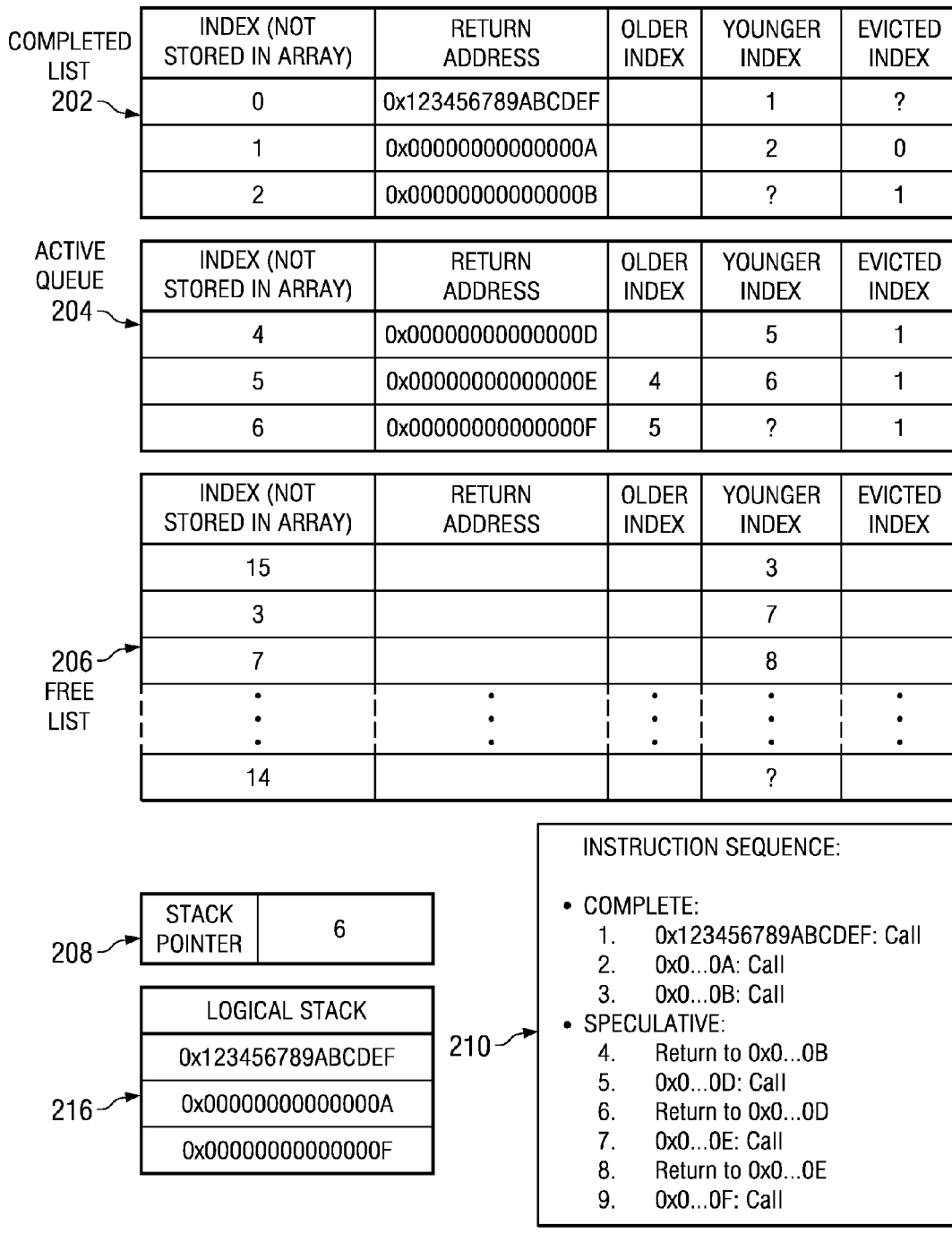

With reference to FIG. 5, a simplified flowchart of the flushing process is depicted showing the manipulation of the various pointers during the process. The process begins with initializing physical data structures which readies them for use (operation 402). Processing the instruction stream occurs in a normal manner (operation 404). While processing the instruction stream, known techniques are used to determine if a bad prediction causing an exception due to an incorrect prediction occurs (operation 406). If "no" at operation 406, there is no error and processing returns to operation 404 to continue processing the instruction stream. Otherwise an exception is noted, ("yes" at operation 406) and a flush is required causing a read from operation control table 214 to obtain values, (operation 408). Values comprising a stack pointer, active tail pointer, and allocated are typically found, while other values may be present for differing purposes.

Next, set the stack pointer=flushed stack pointer (operation 410). Then set younger index of the free list tail=younger index of the flushing active tail (operation 412) and set free list tail=active queue tail (operation 414). The process then sets active queue tail=flushed active queue tail (operation 416) and returning to operation 404 and repeats.

The sequence of operations may be used to effectively eliminate entries 6 though 10 in the instruction stream 210 of FIG. 2A, "moving" a previously allocated entry, if any, and all younger entries from Active queue 204 physical data structure to free list 206 physical data structure of FIG. 2A by manipulation of the associated pointers just described.

With reference to FIG. 6A-6K, a sequence of results of processing instruction stream 210 of FIG. 3A may be seen with regard to changing values in physical data structures 200 elements. Through the sequence of operations the flow from an initial state to a state prior to the flush operation of FIG. 4A-4H may be seen.

Figure 7A:
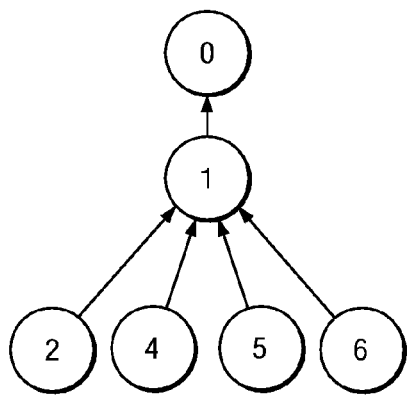
FIGS. 7A-7E are pictorial representations of node relationships and traversals in accordance with illustrative embodiments.

With reference to FIGS. 7A-7E, a sequence of interactions using the information contained within the physical data structures, such as physical data structures 200 of FIG. 3A may be seen. In particular FIG. 7A depicts a data structure of the evicted pointers typically maintained, for example, to correspond to the state as shown in FIG. 3A. FIG. 7A shows a tree structure with node 0 at the peak and nodes 2, 4, 5 and 6 at the base. Each node below node 0 has a pointer to the next higher node.

Figure 7B:
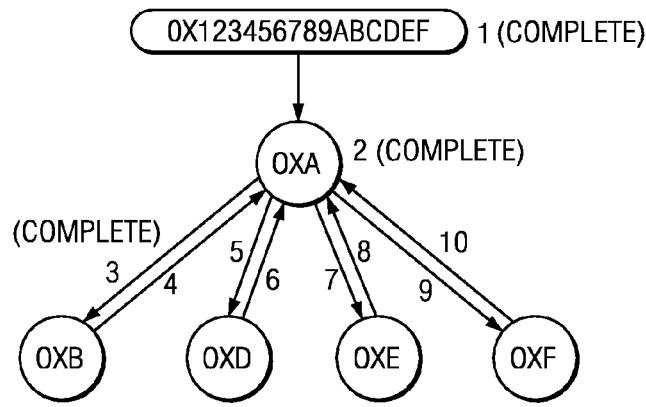

In FIG. 7B, the previous view is represented in another form. Element "1" (complete) points to instruction or node "0×1234556789ABCDEF" that further points to element "2" (complete) representing node "0×A". The lower level nodes each have forward and backward pointers as shown. For example, node "0×B" has a forward pointer "3" and a backward pointer "4". The use of the pointers then enables traversal of related nodes.

Figure 7C:
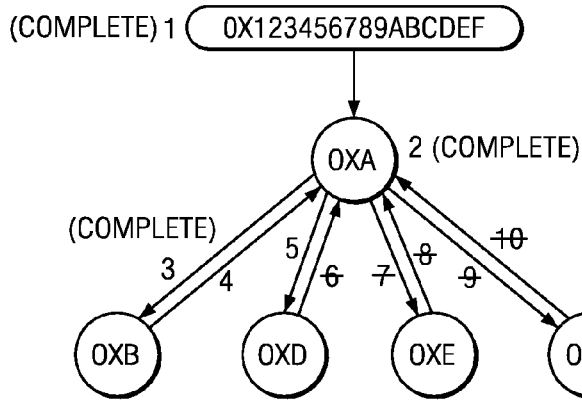

Now in FIG. 7C, as previously shown, instruction sequence number 6 from an instruction stream is declared to be a bad prediction speculative entry. This instruction node and all younger node traversals form a collection of entries that therefore have to be discarded. The pointer chain representing the collection of instruction sequence numbers 6 through 10 will be discarded. In the process, nodes "0×D", "0×E" and "0×F" are freed as they are no longer connected to the branch structure associated with node 0×A. Node "0×D" remains, as there is an association evident with instruction sequence number 5. Node "0×D" is not lost nor are other entries unrelated to instruction sequence number 6 arbitrarily discarded. Only the entries related to, and including, the specific bad prediction speculative entry, instruction, initiating the flush has been discarded. Further the association is tracked in physical data structures and does not have to be sequentially calculated nor processed. The pointer chain may be rapidly traversed to determine the entries to discard.

Figure 7D:
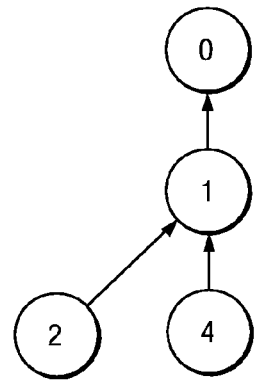

With reference to FIG. 7D, the evicted pointer tree of FIG. 7A may be seen in a reduced form. Entries for instructions 5 and 6 have been discarded because nodes "0×E" and "0×F" were removed during the flush operation. The evicted pointers form a tree structure tracking the return paths for all branch paths, currently speculative, in the system.

Figure 7E:
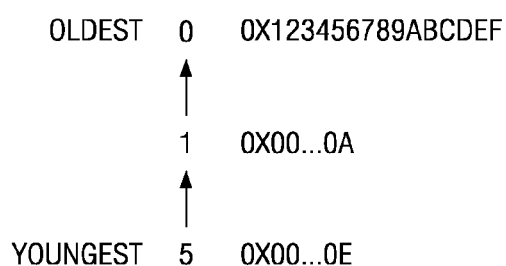

With reference to FIG. 7E, the current stack pointer is at the youngest node in the current return path. From there, the next oldest entry is pointed to by that node's evicted pointer. Next one may trace backward until the head of the complete list or a null value is reached. For example, node "0×D" has a younger index of "5" with an evicted pointer of "1" and node "0×A" has a younger index of "0" and node "0×123456789ABCDEF", which is the head of the completed list.

In this manner differing embodiments may effectively reduce the time required to perform a flush operation necessitated by an incorrect prediction of a speculative instruction. Information tracked through the use of the physical data structures of the illustrative embodiments typically maintains data to return to the previous known state prior to the instruction leading to the flush operation. Further entries associated with bad prediction speculative entry, instruction are tracked in physical data structures and do not have to be sequentially calculated nor processed. The pointer chain may be rapidly traversed to determine the collection of entries to discard.

The invention can take the form of an entirely hardware embodiment, or an embodiment containing both hardware and software elements. In a preferred embodiment, the invention is implemented in hardware, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method in a data processing system, which includes a processor, for link stack misprediction resolution, the method comprising:
   establishing, within the processor, a set of physical data structures forming a common pool and an operation control table;
   maintaining, within the common pool, a plurality of entries for a plurality of speculative instructions and a plurality of non-speculative instructions;
   wherein the maintaining further comprises maintaining a stack pointer, maintaining an evicted index for each entry, and setting the evicted index to a previous instance of the stack pointer for each new speculative entry allocated on a fetch of a speculative call;
   responsive to the processor determining that one speculative instruction is a bad prediction speculative entry, identifying, by the processor, related entries to form a collection; and
   discarding, by the processor, the collection.

2. The method of claim 1, wherein establishing the common pool further comprises:
   a completed list including non-speculative entries and
   an active queue including speculative entries.

3. The method of claim 1, wherein the identifying related entries further comprises identifying only speculative entries younger than the bad prediction speculative entry.

4. The method of claim 1, wherein the discarding further comprises removing at least the bad prediction speculative entry and related entries from the active queue by manipulation of a plurality of pointers and setting a stack pointer to a location indicated in the operation control table.

5. The method of claim 1, wherein discarding the collection further comprises freeing at least one node.

6. The method of claim 1, wherein the stack pointer is set to an index of an allocated entry.

7. The method of claim 1, wherein the maintaining further comprises setting the stack pointer to the evicted index of the entry pointed to by an old instance of the stack pointer on a fetch of a speculative return.

8. The method of claim 2, wherein maintaining further comprises moving an oldest speculative entry on the active queue to the complete queue, by pointer manipulation, on completion of a speculative call.

9. The method of claim 2, wherein maintaining further comprises removing a youngest entry on the complete queue, by pointer manipulation, on completion of a speculative return.

10. The method of claim 2, wherein establishing the common pool further comprises a free list as one of a separate free list and free list at a head of the completed list.

11. A data processing system, which includes a processor, for link stack misprediction resolution, the data processing comprising:
    a set of physical data structures, established within the processor, forming a common pool and an operation control table;
    the processor maintaining, within the common pool, a plurality of entries for a plurality of speculative instructions and a plurality of non-speculative instructions;
    wherein the processor maintaining, within the common pool, a plurality of entries further includes the processor maintaining a stack pointer, maintaining an evicted index for each entry, and setting the evicted index to a previous instance of the stack pointer for each new speculative entry allocated on a fetch of a speculative call;
    responsive to the processor determining one speculative instruction to be a bad prediction speculative entry, the processor identifying related entries to form a collection; and
    the processor discarding the collection.

12. The data processing system of claim 11, wherein the common pool further comprises:
    a completed list including comprising non-speculative entries; and
    an active queue including speculative entries.

13. The data processing system of claim 11, wherein the processor identifying related entries further comprises the processor identifying only speculative entries younger than the bad prediction speculative entry.

14. The data processing system of claim 11, wherein the processor discarding further comprises the processor removing at least the bad prediction speculative entry and related entries from the active queue by manipulation of a plurality of pointers and setting a stack pointer to a location indicated in the operation control table.

15. The data processing system of claim 11, wherein the processor discarding the collection further comprises the processor freeing at least one node.

16. The data processing system of claim 11, wherein the processor maintaining, within the common pool, a plurality of entries further comprises the processor setting the stack pointer to the evicted index of the entry pointed to by an old instance of the stack pointer, on a fetch of a speculative return.

17. The data processing system of claim 12, wherein the processor maintaining, within the common pool, a plurality of entries further comprises the processor moving an oldest speculative entry on the active queue to the completed list, by pointer manipulation, on completion of a speculative call.

18. The data processing system of claim 12, wherein the processor maintaining, within the common pool, a plurality of entries further comprises the processor removing a youngest entry on the completed list, by pointer manipulation, on completion of a speculative return.

* * * * *